United States Patent [19]

Ackermann et al.

[11] Patent Number: 4,505,368
[45] Date of Patent: Mar. 19, 1985

[54] OPERATOR-CONTROLLED AUTOMOTIVE GEAR OR TRANSMISSION CHANGE SYSTEM

[75] Inventors: Fritz Ackermann, Stuttgart; Eberhard Schnaibel, Hemmingen, both of Fed. Rep. of Germany

[73] Assignee: Robert Bosch GmbH, Stuttgart, Fed. Rep. of Germany

[21] Appl. No.: 417,359

[22] Filed: Sep. 13, 1982

[30] Foreign Application Priority Data

Sep. 18, 1981 [DE] Fed. Rep. of Germany ....... 3137217

[51] Int. Cl.³ .............................................. B60K 41/28
[52] U.S. Cl. .............................. 192/0.092; 192/103 R
[58] Field of Search ................. 192/0.052, 0.062, 0.07, 192/0.075, 0.08, 0.092, 0.076, 103 R; 74/858, 859, 860, 865, 866, 875

[56] References Cited

U.S. PATENT DOCUMENTS

| 2,622,711 | 12/1952 | Chambonneau | 192/0.08 |
| 2,739,678 | 3/1956 | Parker | 192/0.092 |
| 3,204,730 | 9/1965 | Alfieri et al. | 192/0.08 |
| 3,667,577 | 6/1972 | Weymann | 192/0.092 |
| 4,194,608 | 3/1980 | Usui et al. | 192/0.052 |
| 4,228,700 | 10/1980 | Espenschied et al. | 74/866 |

FOREIGN PATENT DOCUMENTS 0020525 2/1979 Japan ............................ 192/0.052

Primary Examiner—George H. Krizmanich
Attorney, Agent, or Firm—Frishauf, Holtz, Goodman & Woodward

[57] ABSTRACT

To permit use of a manual transmission with the advantage of positive drive and hence better fuel economy with a controlled clutch (14), for example under operator control (13) or gear selection control (2013), an engine fuel control positioning stage (11) is provided which receives, upon start of the vehicle and change of the transmission from neutral to first gear, an engine starting speed reference signal from an engine speed controller (19). The clutch, under operator or gear change control, has a disengagement path (15) which causes rapid disengagement of the clutch and a connection or reengagement path (16) which operates with time delay to cause gradual engagement of the clutch so that smooth start-up is insured. A suitable start-up speed is idle speed of the engine, or close thereto.

10 Claims, 2 Drawing Figures

OPERATOR-CONTROLLED AUTOMOTIVE GEAR OR TRANSMISSION CHANGE SYSTEM

Reference to related patent and application, the disclosure of which is hereby incorporated by reference, assigned to the assignee of the present application:

U.S. Pat. No. 4,228,700, Oct. 21, 1980, ESPENSCHIED et al;

U.S. Pat. No. 398,349, filed July 15, 1982, JUNGINGER et al.

The present invention relates to a gear change system for use in automotive vehicles, and more particularly to manual transmission in which automatic, preferably electronic apparatus is provided to synchronize engine speed with transmission gear speed upon change of transmission gearing, and the operator has a clutch pedal to separate the engine from the transmission upon gear change.

BACKGROUND

Various types of gear change or transmission arrangements for automotive vehicles are known, in which a servo motor or magnetically controllable positioning element is arranged to control the throttle or other fuel control device positioned between the accelerator or fuel control pedal and the actual fuel control element. The fuel control element may be, for example, the throttle in a carburetor engine, or another control element, such as a potentiometer, or the like, for a fuel injection system. The positioning element which controls the amount of fuel is interposed between the actual fuel controller and the operator controllable engine control element, typically the accelerator pedal, so that the actual deflection of the accelerator pedal is not transmitted to the positioning element as such, but rather decoupled therefrom. Consequently, it is possible to operate the fuel metering element—the throttle or other fuel control element—in accordance with control considerations which are different from the actual operation of the accelerator pedal. Such control considerations may, for example, be used to insure that gear shifting is carried out smoothly or, for example, to optimize fuel economy or the like. A gear change system including engine control is described in the referenced U.S. Pat. No. 4,228,700, ESPENSCHIED et al., assigned to the assignee of the present application.

The transmission control system is particularly applicable to automatic transmissions. Automatic transmissions, due to their innate construction, have a higher fuel consumption than manually controlled transmissions.

It has previously been proposed to couple manual transmissions to a clutch which is operated under automatic control. Clutches of this type which, for example, may include centrifugal clutches, are expensive and lead to malfunction, by causing undesired gear changes if the operator, for example while a gear change occurs, erroneously presses hard on the accelerator pedal.

THE INVENTION

It is an object to provide a control system for manually operated transmissions which results in soft or smooth gear shifting.

Briefly, a clutch, upon operation of a clutch pedal is caused to, to disengage or declutch rapidly and without time delay, but to engage with time delay; an engine speed controller is provided which controls the engine speed so that the gearing within the gear box will be matched to the newly selected gear and, upon starting, to a predetermined speed, for example a start-up idling speed.

The system has the advantage that it is simple and reliable; further, it permits use of the more fuel efficient manual transmission, rather than a semi-automatic or automatic transmission, with the consequent advantage of reliability, while providing the advantages of control systems which result in smooth and gradual gear shifting and thus improve riding comfort to the occupants of an automotive vehicle.

DRAWINGS

FIG. 1 is a schematic block circuit diagram illustrating an embodiment of the present invention: and FIG. 2 is a series of timing diagrams of signals and events arising in the system of FIG. 1 in operation thereof.

DETAILED DESCRIPTION

Figure 1:
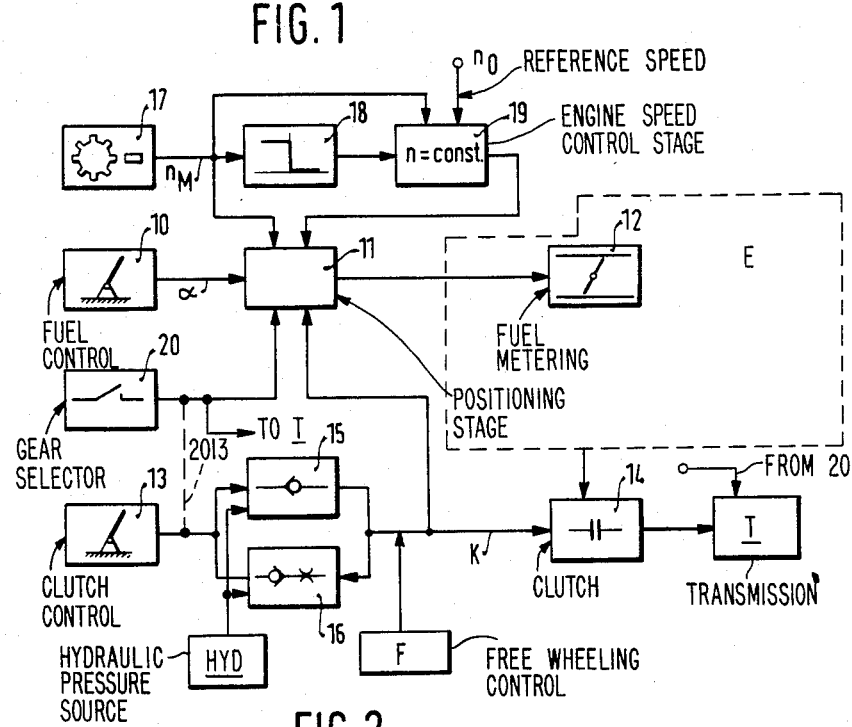

A fuel control pedal 10, for example the accelerator pedal of an automotive vehicle, is coupled over a positioning stage 11 to a fuel metering element 12, illustrated as the throttle of an internal combustion engine, schematically illustrated by block E. The throttle 12, of course, may be replaced by any other type of fuel control device in order to control the quantity of fuel being supplied to the engine. The output signal of the fuel control pedal 10 is denoted $\alpha$ and will be representative of the deflection of the pedal 10. The accelerator pedal 10, as well known, is operator controlled.

A clutch pedal 13 is provided which is connected to a separating clutch 14, separating the engine from the transmission T. The clutch pedal 13 is not directly connected to the clutch 14, but rather through two differing paths. A first path 15 is so arranged that movement of the clutch pedal in a separating or disconnecting direction, for example depressing the clutch pedal, causes immediate undelayed operation of separation of the clutch, that is, separation of the engine from the transmission T. In the reverse, however, upon re-engagement of the clutch, a delay is interposed. The clutch operation, itself, for example is hydraulically controlled by pressure from a pressure source HYO. Immediate operation in the path 15, hence, is schematically indicated by a check valve, whereas the engaging operation, path 16, includes an additional throttle which delays complete engagement of the clutch for a predetermined delay time.

The output signal from the clutch pedal 13 is transmitted to the positioning stage 11.

An engine speed transducer 17 is coupled to the engine E and provides engine speed output signals $n_M$. The output signal $n_M$ is connected to a threshold stage 18 which controls a speed control stage 19. Speed control stage 19, further, receives a reference speed signal $n_O$ which, for example, may correspond to idle speed, or a speed suitable for start-up of the vehicle. The positioning stage 11 receives an input both of the actual engine speed signal $n_M$ as well as an output from the speed controller 19.

A gear selector 20 provides output signals representative of a gear which is engaged, or where the transmission is in "neutral" position. The output signals from the gear selector 20 are coupled to the positioning stage 11. Additionally, or course, the gear selector controls the transmission T. The signals being provided to the positioning stage are representative of the particular gear or "neutral" then operative in the transmission T.

Figure 2:
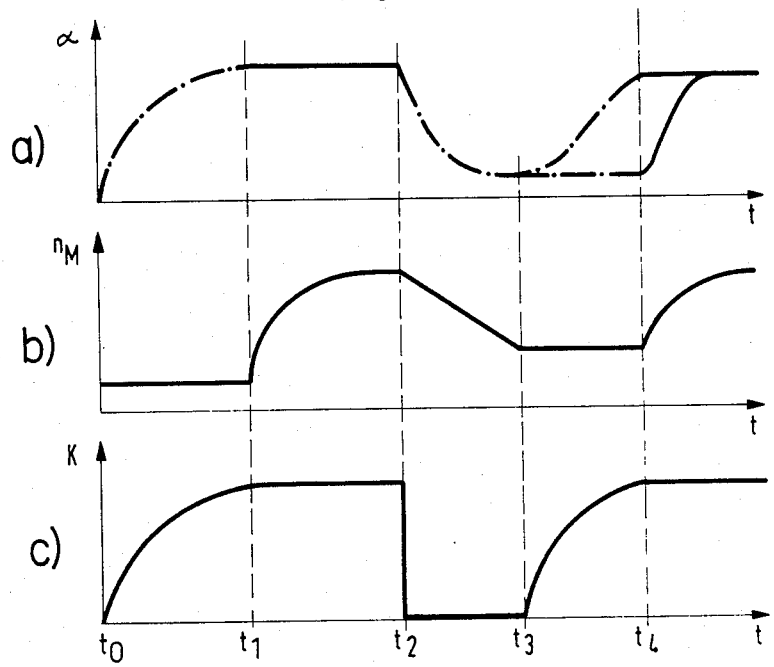

Operation, with reference to FIG. 2: Various signals are shown with respect to a time axis (abscissa) in graph a the deflection of the fuel control pedal α, graph b the actual speed of the engine $n_M$, and graph c the clutch signal K.

The three graphs are shown in alignment with respect to the same time axes.

Let it be assumed, first, that at time $t_0$ the vehicle is stopped, but the engine is running. It is desired to start the vehicle. The operator will, accordingly, deflect the fuel controller 10—see graph a. Let is be assumed that in this position the gear selector 20 of the vehicle was placed in "neutral". Deflection of the fuel control pedal 10, will not affect increase in fuel 12 since the positioning stage 11, by signal from gear selector 20, has recognized that the gear is in neutral. Stopped condition of the vehicle may, of course, also be recognized differently, for example by a vehicle speed detector, providing vehicle speed signals, for example from wheel rotation.

During the starting phase, the fuel metering element 12 is so set in dependence on the engine speed control stage 19 that, during the delayed full engagement of the clutch 14, the engine is controlled to operate at a predetermined reference speed $n_0$, for example at an idling or start-up speed.

If the operator now engages the first gear, and releases the clutch control pedal 13, the clutch will close gradually due to the delay 16—seen graph c of FIG. 2. During this delayed complete engagement of clutch 14, the engine speed is still controlled to operate at the reference speed $n_0$. The clutch will be completely engaged at the time $t_1$. This is transmitted to the positioning stage 11 by the signal K which, then, will transfer control of the fuel metering element, that is, in the illustration the throttle 12, from the stage 11 to the fuel control element 10.

At the time between $t_1$ to $t_2$, an engine speed $n_M$ will result which depends on the deflection of the fuel control element 10, that is, on the position thereof represented by α.

The vehicle will accelerate. Let it be assumed that at time $t_2$, gear 1 which is the then present gear, is to be changed to a newly selected gear, namely the second gear. To change gears, the operator will depress the clutch control pedal 13, which will be immediately signaled to the positioning stage 11 by a K signal. The positioning element 11 will now command operation of the synchronization device described in the referenced U.S. Pat. No. 4,228,700, ESPENSCHIED et al. The synchronization device, preferably, will control the speed of the engine in accordance with predetermined characteristics depending on the then present or previously engaged gear and the newly selected gear. It is, of course, not necessary that the gears be changed in direct sequence; for example, shifting from second to fourth gear can be carried out in one step, the positioning stage 11 then controlling the engine to operate at the speed which is appropriate to the newly selected gear as selected by the gear selector 20. Graph b shows the change in engine speed which, assuming an upshift, will drop although the same vehicle speed is being maintained. The electrical contact coupled to the gear selector 20 will signal the respective change in gearing to the positioning stage 11, so that the engine controller therein can control synchronous speed of the engine for the then pertaining vehicle speed and gear ratio.

During this time, the signal α from the accelerator pedal is decoupled from direct control of the fuel metering element or throttle 12, which is indicated by the chain-dotted representation in graph a of FIG. 2. At time $t_3$, synchronous speed is obtained and the clutch again will close until, at time $t_4$, positive driving connection between engine and transmission is again reestablished. In this case it is not necessary to delay engagement of the clutch, since the engine speed is already synchronized. The transmission itself need then not be a synchromesh transmission, since engine speed synchronization is provided by control of the engine by the positioning stage 11, rather than by the gearing itself.

At time $t_4$, the positioning stage 11 again switches control of the fuel metering element 12, that is, the throttle, to the accelerator pedal 10, so that an engine speed $n_M$ will result which will depend on the operator-controlled position of the accelerator pedal 10.

Upon engagement of the clutch 14, no jolt or engagement shock will be felt since the synchronous speed of the engine was obtained before the clutch engaged.

The engine speed control stage 19 will maintain engine speed. As the clutch engages, positioning stage 11 will control the fuel supply 12 to provide more fuel to maintain the engine speed set by stage 19.

The synchronous speed of the engine can, of course, be determined during synchronization in dependence on actually obtained engine speed, for example deceleration due to terrain, e.g. if the vehicle is operated uphill, or acceleration, that is, if the vehicle is on a downhill road profile.

The present invention is particularly suitable in combination with a system in which, rather than using a clutch pedal 13, an operating element is provided which controls engagement and disengagement of the clutch 14 under pneumatic, hydraulic, or electromechanical operation and control. Such a control element may be a portion of a free-wheeling or over-running system F described, for example, in the referenced application U.S. Ser. No. 398,349, filed July 15, 1982, JUNGINGER et al, and incorporated by reference herein.

Various changes and modifications may be made within the scope of the inventive concept.

For example, the clutch 14 can be operated via the respective paths 15, 16 as a function of gear selection, by providing a coupling link 2013 from the gear selector 20, connectable in parallel with the clutch pedal 13, for example selectively as desired, to provide for automatic clutch operation upon changing a gear setting from any selected gear position to another one, to then cause operation of the clutch 14 through a power operation, for example a fluid controlled, preferably hydraulic clutch operating system, of any suitable type and design.

Graph a of FIG. 2 shows that the accelerator position in the time between $t_3$ and $t_4$ may be controlled by the operator in various ways. Regardless of operator control, however, the engine speed is not dependent on accelerator position but, rather, controlled by the positioning stage which can be readily seen by comparing graphs a and b in FIG. 2; the actual engine speed will be independent of the accelerator position, due to control of the engine by the positioning stage 11, rather than by the accelerator 10 at the time when the clutch 14 is not yet fully engaged, as signaled to the positioning stage 11 by the signal K.

If the control of clutch 14 is by hydraulic means—as illustrated—then signal K can readily be derived by connecting an electrical pressure transducer into the hydraulic line which will provide an output signal representative of pressure in the clutch control line—full pressure when the clutch is engaged, no pressure when the clutch is disconnected, and a rising signal corresponding to a rising pressure as engagement pressure builds up through the throttle within the engaging path 16. Of course, equivalent engagement—signal transducers can be used, for example one or more potentiometers coupled to an operating linkage or signal transducers coupled to an electromagnetic clutch control system.

We claim:

1. In a vehicle, an operator-controlled automotive gear or transmission change system, said vehicle having an automotive-type engine (E), a transmission (T), and a clutch (14) interposed between the engine and the transmission, comprising an operator-controlled selector (20) providing gear selector output signals representative of a selected transmission gear and controlling the transmission (T);

a fuel metering means (12) controlling speed and power of engine operation;

an operator-controlled fuel supply control means (10);

an operator-controlled clutch control means (13);

a clutch disconnect control means (15) connected between the clutch control means and the clutch (14) for controlling clutch disconnect operation as a consequence of operation of the clutch control means (13);

a clutch connect control means (16) connected between the clutch control means (13) and the clutch (14) for controlling clutch connection or engagement operation after a disconnect operation, with time delay;

a fuel metering positioning stage (11) receiving the gear selector output signals, connected to and controlling the fuel metering means (12) to cause the engine (E) to operate at a controlled speed corresponding to a selected transmission gear;

and an engine speed reference signal generating means (19) for generating a signal representative of a predetermined engine speed in the low speed operating range thereof, said reference signal generating means being coupled to said positioning stage (11), said positioning stage in turn controlling the fuel metering means (12) and hence the engine (E) upon change of transmission gearing from a neutral position to a first or starting gear to provide for an initial engine speed control at said predetermined speed upon engagement of the clutch and upon starting of the vehicle in which the engine is installed.

2. System according to claim 1, wherein the clutch control means (13) comprises a clutch pedal, said disconnect control means and connect control means coupling, selectively, the clutch pedal to the clutch (14).

3. System according to claim 1, further including power operating means coupled to the clutch to operate the clutch in engaging and disengaging direction.

4. System according to claim 3, including coupling means (2013) causing the power operating means to disengage the clutch via the disconnect control means upon sensing of change of position of the gear selector (20) and re-engagement of the clutch via said connect control means (16) upon sensing engagement of a newly selected gear by the gear selector (20).

5. System according to claim 4, wherein the power operating means comprises a fluid operating means.

6. System according to claim 5, wherein the fluid operating means comprises hydraulic operating means.

7. System according to claim 3, wherein the power operating means comprises a fluid operating means.

8. System according to claim 7, wherein the fluid operating means comprises hydraulic operating means.

9. System according to claim 3, further including a free-wheeling control (F) coupled to the clutch control means.

10. System according to claim 1, wherein said engine speed reference signal generating means generates a signal representative of about idling speed of the engine (E).

* * * * *